United States Patent

Wojcik

[11] Patent Number: 5,814,163
[45] Date of Patent: *Sep. 29, 1998

[54] COMPOSITION AND PROCESS FOR CLEANING INKS FORM VARIOUS SURFACES INCLUDING PRINTING PLATES

[75] Inventor: Gerald Wojcik, Thomaston, Conn.

[73] Assignee: MacDermid, Incorporated, Waterbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 711,052

[22] Filed: Sep. 9, 1996

[51] Int. Cl.[6] .................................. B08B 7/00; C11D 9/00; C11D 9/04
[52] U.S. Cl. ......................... 134/39; 510/170; 510/171; 510/174
[58] Field of Search .................................. 510/170, 171, 510/172, 173, 174; 134/2, 38, 39, 40, 42

[56] References Cited

U.S. PATENT DOCUMENTS

| | | | |
|---|---|---|---|
| 4,836,950 | 6/1989 | Madsen et al. | 252/153 |
| 4,934,391 | 6/1990 | Futch et al. | 134/40 |
| 5,104,567 | 4/1992 | Staehr | 252/174.17 |
| 5,304,316 | 4/1994 | Urushibata | 252/60 |
| 5,340,493 | 8/1994 | Principato | 252/462 |
| 5,340,495 | 8/1994 | Mulcahy et al. | 252/162 |
| 5,380,453 | 1/1995 | Krawack | 252/162 |
| 5,405,495 | 4/1995 | Cosper et al. | 162/5 |
| 5,415,733 | 5/1995 | Robinson et al. | 162/5 |
| 5,424,001 | 6/1995 | Bayless | 252/170 |
| 5,449,474 | 9/1995 | Lucas et al. | 252/170 |
| 5,616,548 | 4/1997 | Thomas et al. | 510/242 |

*Primary Examiner*—W. Gary Jones
*Assistant Examiner*—Debra Shoemaker
*Attorney, Agent, or Firm*—John L. Cordani

[57] ABSTRACT

The present invention concerns a mixture of at least one monoester, at least one methyl ester, at least one olefinic hydrocarbon, along with other optional ingredients, which mixture is useful in cleaning organic residues, particularly inks, from various surfaces.

19 Claims, No Drawings

5,814,163

COMPOSITION AND PROCESS FOR CLEANING INKS FORM VARIOUS SURFACES INCLUDING PRINTING PLATES

BACKGROUND OF INVENTION

The present invention relates to a relatively safe to use and environmentally safe cleaning liquid for use in the graphics industry. In particular the invention relates to a liquid for cleaning ink from printing machines, printing plates, screens, rubber blankets and ink rollers. As such the cleaning solution of this invention is capable of replacing traditional volatile solvent based cleaning compositions.

Cleaning or washing printing inks from printing plates, rollers, and other machine parts within the graphics industry has been effected by means of cleaning liquids which mainly contain dangerous substances such as low boiling aromatic solvents, and as such entails considerable risks to the individuals handling these substances. In particular, the use of petroleum distillates or aromatic compounds such as xylene or toluene based agents is widespread. The significant health dangers of these substances is well known. Such compounds are, in general, highly volatile and exhibit low flash points.

Because of the health hazards associated with these volatile solvents, various efforts have been made to produce cleaning solutions which are free of such solvents. U.S. Pat. No. 5,104,567, (Staehr) the teachings of which are incorporated herein by reference in their entirety, reveals one such solution. Staehr proposes a solution of vegetable oil and an emulsifier as an ink cleaner. Staehr also gives a fair picture of the prior art in this field.

It is an object of the present invention to provide an ink cleaning solution which is safer to handle and more environmentally friendly than volatile solvents but which is also a more effective cleaning agent than previously taught solvent substitutes. These and other objects of this invention will be apparent to those skilled in the art after reading the disclosure contained herein.

SUMMARY OF THE INVENTION

The present invention relates to a composition and process useful in cleaning inks and ink residues from printing plates, screens, rollers and other parts of printing machines. The composition of the current invention comprises the following:

1). at least one monoester
2). at least one methylester
3). at least one olefinic hydrocarbon
4). optionally, an ester alcohol
5). optionally, tetrahydrofural alcohol
6). optionally, dibasic ester
7). optionally, an alkylene carbonate
8). optionally, a dearomatized aliphatic hydrocarbon
9). optionally, surfactants.

It has been discovered that a mixture of the above indicated materials produces an ink cleaning composition which possesses excellent cleaning properties, but is safer to handle and more environmentally friendly than previously known ink cleaning compositions.

DETAILED DESCRIPTION OF THE INVENTION

The inventor herein has discovered that a particular mixture provides excellent ink and ink residue cleaning ability with relatively safe handling and environmental effects. As such the compositions of this invention are particularly useful in the graphics industry for cleaning printing machines and parts thereof. Basically the compositions of the invention comprise:

1). at least one monoester
2). at least one methylester
3). at least one olefinic hydrocarbon
4). optionally, an ester alcohol
5). optionally, tetrahydrofurfurel alcohol
6). optionally, dibasic ester
7. optionally, an alkylene carbonate
8). optionally, a dearomatized aliphatic hydrocarbon
9). optionally, surfactants.

The monoester is preferably a branched acetate ester and most preferably the monoester has at least nine carbons within its structure. One preferable monoester is Exxate 1000, which is available from the Exxon Chemical Company, and is oxodecylacetate. The concentration of the monoester in the cleaning composition is preferably between 5 and 75 percent by weight, most preferably between 10 and 50 percent by weight.

The concentration of methyl ester in the cleaning composition is preferably between 5 and 75 percent by weight, most preferably between 10 and 30 percent by weight. A preferred methylester is available from the Proctor & Gamble Company and is sold under the tradename CE-1290 and is a methyl laurate ester. However a variety of methyl ester compounds are acceptable. Preferably the methyl ester has an aliphatic backbone as in the preferred methyl laurate ester.

The olefinic hydrocarbons can themselves be a single compound or a mixture of unsaturated aliphatic hydrocarbons. One such example is the Neosolv line of unsaturated aliphatic hydrocarbons available from the Shell Chemical Company. Any one or a combination of these Neosolv's is suitable. Of particular use are Neosolv (4) (1-tetradecene) and Neosolv (6) (1-hexadecene). In general the Neosolv's are linear olefinic hydrocarbons. The concentration of the olefinic hydrocarbons in the cleaning composition can be from 5 to 75 percent by weight but is preferably between 10 and 35 percent by weight.

The ester alcohol can be any ester which has an alcohol functionality. It is preferable that the ester alcohol have a molecular weight of 200 or greater and it is also preferable that the ester alcohol have a stable neopentyl structure. An example of one such ester alcohol is Texanol, which is available from the Eastman Chemical Company of Kingsport, Tenn. One preferred ester alcohol is 2,2,4-trimethyl-1,3-pentanediol mono (2-methyl propanoate). The concentration of the ester alcohol in the cleaning composition is preferably from 5 to 35 percent by weight, most preferably between 5 and 15 percent by weight.

Optionally, tetrahydrofurfural alcohol may be included in the composition. If included, the concentration of tetrahydrofurfural alcohol is preferably between 2 and 35 percent by weight, most preferably between 5 and 15 percent by weight.

Dibasic ester is a material of commerce sold by both the Dupont Company and the Monsanto Company. The concentration of dibasic ester, if utilized, in the cleaning composition is preferably between 5 and 25 percent by weight.

Optionally, dearomatized aliphatic hydrocarbons may be added to the cleaning composition. Particularly Exxsol D80 and Exxsol D110, available from the Exxon Chemical Company, may be used as dearomatized aliphatic hydrocarbons. If added, the concentration of the dearomatized aliphatic hydrocarbons is preferably between 25 and 35 percent by weight, most preferably between 5 and 15 percent by weight.

The alkylene carbonate is preferably an ethoxylated carbonate or propoxylated carbonate such as dipropylene carbonate or propylene carbonate. Suitable alkylene carbonates are sold by the Huntsman Company of Houston, Tex. under the tradename, Texacar and Texacar P.C. The concentration of alkyl carbonate in the cleaning composition is preferably between 2 and 20 percent by weight.

Optionally surfactants or emulsifiers may be added to the cleaning composition. Preferably the surfactants (emulsifiers) used are non-ionic. If used, the concentration of the surfactants (emulsifiers) in the cleaning composition is preferably between 0.5 and 10 percent by weight. It may also be preferable to employ a mixture of surfactants (emulsifiers) depending upon the particular application of the cleaning composition. The addition of surfactants (emulsifiers) is particularly useful if it is important to make the cleaning composition water rinseable and, in fact, when surfactants (emulsifiers) are used very little to no residue remains after a simple water rinse.

As indicated the cleaning composition of this invention is particularly useful in cleaning ink, ink residues and other organic residues from printing apparatus. This cleaning composition effectively cleans and removes a variety of inks and ink residues including heat set, U.V. and offset type inks and residues. These compositions are also useful in cleaning a variety of surfaces.

This invention is further described by the following examples which are meant to further describe particular embodiments of the invention but are not meant to be limiting:

EXAMPLE I

A cleaning solution was prepared according to the following formulation:

|  | % by weight |
|---|---|
| Exxate 1000[1] | 30.0 |
| Texanol[2] | 10.0 |
| Dibasic Ester | 10.0 |
| Tetrahydrofural Alcohol | 5.0 |
| Propylene Carbonate | 5.0 |
| CE-1290[3] | 14.0 |
| NeoSolv (6)[4] | 26.0 |

[1]Available from Exxon Company
[2]Available from Eastman Chemical Company
[3]Available from Proctor & Gamble Company
[4]Available from Shell Company The above indicated formulation was then utilized to clean various types of inks, ink residues, and other organic residues from various surfaces including metal, rubber, plastic and ceramic. The results were excellent, meaning that the composition effectively cleaned the surfaces without damage to the surfaces.

EXAMPLE II

A cleaning solution was prepared by adding 30 grams per liter of Triton X-100 (available from the Rhom & Hass Company) to the formulation given in example I. The resulting cleaning composition was water rinseable and left very little to no residue after rinsing.

This formulation was then utilized to clean various types of inks, ink residues and other organic residues from various surfaces including metal, rubber, plastic and ceramic. The results were excellent meaning that the composition effectively cleaned the surfaces without damage to the surfaces.

What is claimed is:

1. A composition useful in cleaning organic residues from various surfaces, said composition comprising:
    a. at least one monoester;
    b. at least one methyl ester;
    c. at least one linear olefinic hydrocarbon; and
    d. 2,2,4-trimethyl-1,3-pentanediol mono (2-methyl propanoate).

2. A composition according to claim 1 wherein the organic residues are selected from the group consisting of inks and ink residues.

3. A composition according to claim 1 wherein the surfaces are selected from the group consisting of printing apparatus, rollers and screens.

4. A composition according to claim 1 which additionally comprises an alkyl carbonate.

5. A composition according to claim 4 which additionally comprises a compound selected from the group consisting of surfactants and emulsifiers.

6. A composition according to claim 5 which additionally comprises a dibasic ester.

7. A composition according to claim 6 wherein the concentration of the olefinic hydrocarbon is between 10 and 35 percent by weight.

8. A composition according to claim 6 wherein the concentration of the monoester is between 10 and 50 percent by weight.

9. A composition according to claim 6 wherein the concentration of the methyl ester is between 10 and 30 percent by weight.

10. A composition according to claim 6 wherein the concentration of dibasic ester is between 2 and 25 percent by weight and wherein the alkyl carbonate is dipropylene carbonate.

11. A composition according to claim 6 wherein the surfactants are nonionic and wherein the concentration of the surfactants is between 0.5 and 10 percent by weight.

12. A process for cleaning organic residues from a substrate, said process comprising contacting the substrate with a composition comprising:
    a. at least one monoester;
    b. at least one methyl ester;
    c. at least one linear olefinic hydrocarbon and
    d. 2,2,4-trimethyl-1,3-pentanediol mono (2-methyl propanoate).

13. A process according to claim 12 wherein the organic residues are selected from the group consisting of inks and ink residues.

14. A process according to claim 12 wherein the substrate is selected from a group consisting of printing apparatus, rollers and screens.

15. A process according to claim 12 wherein the composition additionally comprises an alkyl carbonate.

16. A process according to claim 15 wherein the composition additionally comprises a compound selected from the group consisting of surfactants and emulsifiers.

17. A process according to claim 16 wherein the composition additionally comprises dibasic ester.

18. A process according to claim 17 wherein the composition additionally comprises an ester alcohol having a molecular weight of at least 200 and wherein the concentration of the ester alcohol is between 5 and 35 weight percent.

19. A process according to claim 17 wherein the concentration of the olefinic hydrocarbon is between 10 and 35 percent by weight.

* * * * *